March 27, 1962 D. EKLÖV 3,027,428
TELEPHONE APPARATUS
Filed Dec. 26, 1957
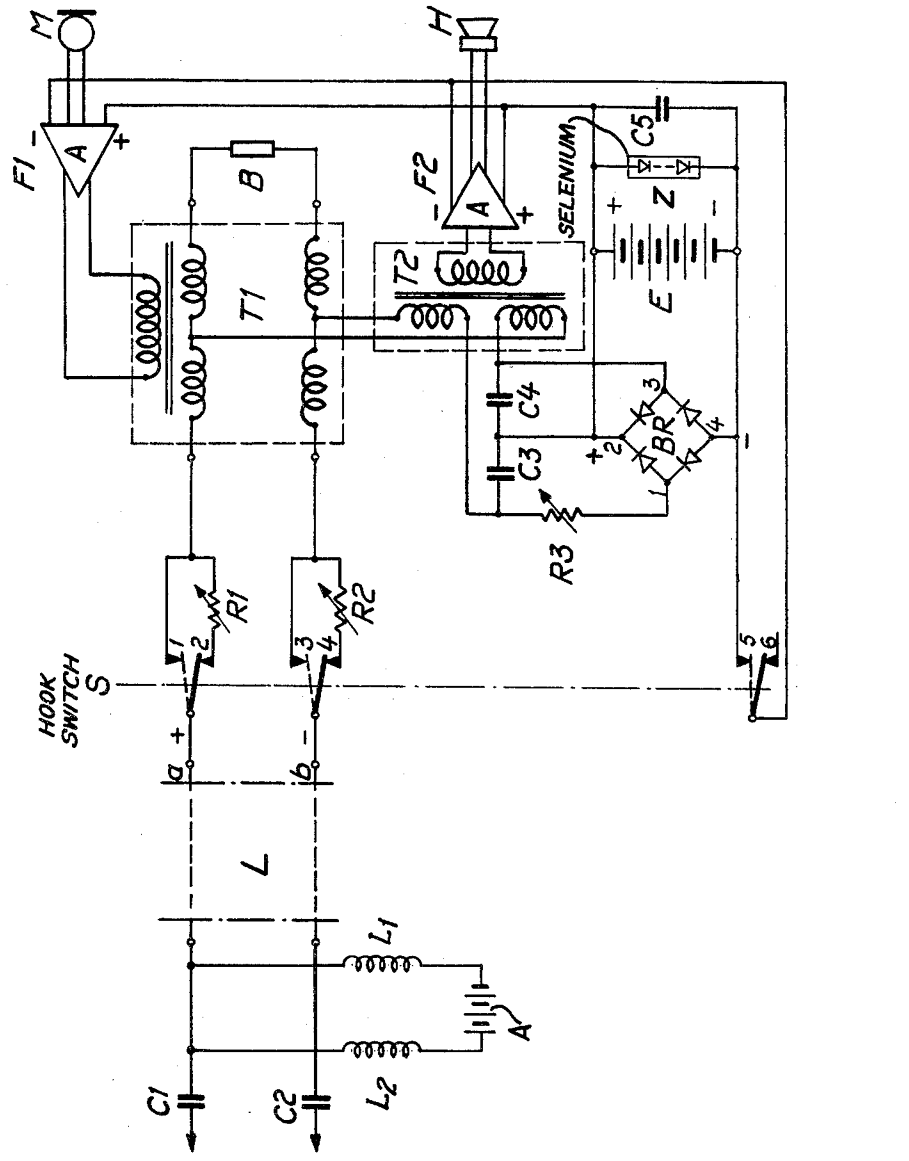
INVENTOR.
David Eklöv
BY Strauch, Nolan & Neale
ATTORNEYS United States Patent Office 3,027,428
Patented Mar. 27, 1962

3,027,428

TELEPHONE APPARATUS

David Eklöv, Alvsjo, Sweden, assignor to Svenska Relafabriken Abn Ab, Tyreso, Sweden, a corporation of Sweden Filed Dec. 26, 1957, Ser. No. 705,359
Claims priority, application Sweden Sept. 17, 1957
9 Claims. (Cl. 179—81)

The present invention relates to a telephone apparatus having amplifiers for incoming and outgoing speech current, the amplifiers being adapted to receive the direct current energy required for their operation from a direct current source, located at a telephone exchange or a private automatic exchange over the same conductors which are used for the transmission of speech current. Telephone apparatus of the foregoing type in which the invention has been incorporated is disclosed in my copending application Serial No. 705,382, filed on even date herewith.

Hitherto, great difficulties have been encountered in supplying direct current to amplifiers housed in telephone apparatuses over the line to which the telephone apparatus is connected, since the various subscribers' lines in a telephone network have a highly varying length and hence offer different resistances, so that the voltage applied to the amplifiers in the telephone apparatus is sometimes insufficient while in other cases it may be too high. Moreover it must be seen to that the conductors of the subscribers' lines are connected with the correct polarity to the telephone apparatus which entails extra difficulties in the installation of the apparatus. If the amplifiers in the telephone apparatus contain transistors it is of great importance that the direct current supplied to the amplifiers does not assume a too high value or the wrong polarity, since in such case the amplifiers are not only made inoperative but are also damaged.

It is an object of the present invention to provide a telephone apparatus of the kind defined having means for permitting the apparatus to be connected to subscribers' lines the D.C. voltage of which may vary within wide limits.

A further object of the invention is to provide a telephone apparatus of the kind defined having means for storing energy during intervals of low excitation of the amplifiers and delivering additional energy to the amplifiers during intervals of high excitation of the amplifiers.

A still further object of the invention is to provide a telephone apparatus of the kind defined, the amplifiers of which receive operating D.C. voltage from the line of correct polarity irrespective of the polarity of the D.C. voltage between the conductors of the line.

According to the invention the telephone apparatus comprises voltage stabilizing means for stabilizing the direct voltage supplied to the amplifiers from the line to which the apparatus is connected.

The telephone apparatus according to the invention is also provided with a capacitor of high capacity connected in parallel with the voltage stabilizing means.

Other subjects and features of the invention will appear from the following description in conjunction with the accompanying drawing which shows a simplified circuit diagram of a telephone apparatus embodying the invention.

The telephone apparatus illustrated on the drawing is of the loud-speaking type and comprises a loudspeaker H and a microphone M. The loudspeaker H is connected to the output side of the amplifier F2 which is connected to the input transformer T2. The microphone M is connected to the input side of amplifier F1. Amplifier F1 and input transformer T2 are connected in known manner to a hybrid coil T1 so that the output voltage from amplifier F1 is prevented from being transferred to the input of amplifier F2. To the hybrid coil are also connected a balance B and the terminals *a* and *b* for connecting the apparatus to a subscribers' line. On the drawing the apparatus is shown connected via a subscriber's line L to a telephone exchange in which there is provided a battery A which supplies direct current to line L over the current feed coils L1 and L2.

The telephone apparatus further comprises a switch S for connecting the apparatus to the line. According to the invention the telephone apparatus also comprises the resistors R1, R2 and R3, rectifier bridge BR, the voltage stabilizing device Z and the capacitor C5. The apparatus may also include a local battery E.

Upon a call to or from the telephone apparatus the switch S is changed over to the position indicated by dotted lines on the drawing. Then the following direct current circuit is closed: positive pole and battery A—current feed coil L1—one line conductor of line L—connecting terminal *a*—contact 1 of switch S—winding of hybrid coil T1—one half of the primary winding of transformer T2—point 3 on rectifier bridge BR——point 2 on the same rectifier bridge—amplifiers F1 and F2 in parallel—contact 5 of switch S—point 4 on rectifier bridge BR—point 1 on the rectifier bridge—resistor R3—second half of the primary winding of transformer T2—winding of hybrid coil T1—contact 3 of switch S—connecting terminal *b*—the second line conductor of line L—current feed coil L2—negative pole of central battery A. Due to the rectfier bridge BR the polarity of the direct voltage applied to the voltage stabilizing device Z and to the amplifiers will be the same independent of the polarity of the voltage on the line conductors of line L.

The voltage stabilizing device Z stabilizes the voltage applied to the amplifiers so that this voltage cannot assume impermissibly high values. The voltage stabilizing device can consist of e.g. a non-linear resistor, the resistance of which is very high, as long as the voltage across the resistor does not exceed a certain value, and rapidly decreases when the voltage exceeds this value.

An example of a resistor of this kind is the selenium rectifier which does not pass current even in the forward direction if the voltage across the rectifier does not exceed a certain value. For a single selenium rectifier cell this value is rather small, and in order to obtain a usable non-linear resistor the resistance of which does not decrease at a too low value of the applied voltage, it is necessary to connect an adequate number of selenium cells in series.

The capacitor C5 which has a very high capacity, e.g. 500 microfarads, serves to store direct current energy during periods with low excitation of the amplifiers and to deliver additional energy during periods of high excitation of the amplifiers.

The direct current power applied to the amplifiers F1 and F2 over the line from the central battery A is sometimes insufficient to allow full excitation of the amplifiers. In this case a local storage battery E may be provided in the apparatus to deliver additional power to the amplifiers. When the switch S is in the position indicated by full lines on the drawing, that is when no connection is established to or from the telephone apparatus, the direct current circuit for amplifiers F1 and F2 is interrupted at contact 5 of switch S. The storage battery E and the stabilizing device Z however still obtain voltage from the line over the resistors R1 and R2. Hereby the storage battery E receives charging current during the time when the telephone apparatus is not in operation. The intensity of the charging current can be regulated by means of variable resistors R1, R2 and R3. When switch S is changed over to the position indicated by dotted lines, resistors R1 and R2 are disconnected from the direct current while resistor R3 remains in this circuit so that a direct current received over the line is still limited to a certain extent. The variable resistors R1, R2 and R3 are set to a suitable resistance when the apparatus is installed in the telephone network, and this setting usually needs not be changed afterwards.

As appears from the drawing the direct current is fed from the line to the amplifiers F1 and F2 over the primary winding of the input transformer T2 of amplifier F2. The capacitors C3 and C4 which are connected in series with the primary winding of transformer T2 serve as bypass capacitors for the voice frequency current.

The storage battery E is preferably a miniature accumulator of the alkaline type which can be subjected to excessive charging for some time without being damaged. Since the storage battery E is needed only in exceptional cases, the telephone apparatus is provided with connecting means which make possible an easy removal and insertion of the storage battery.

In addition to the components shown on the drawing the telephone apparatus of course contains calling and signalling devices which have not been shown on the drawing, since they are not directly concerned with the invention.

The telephone apparatus shown on the drawing and described above is only an example of an embodiment of the invention and can be modified in many ways within the scope of the invention.

What is claimed is:

1. Telephone apparatus comprising an amplifier unit for outgoing speech signals, an amplifier unit for incoming speech signals, terminals for connecting the apparatus to a telephone line for transmission of speech signals and direct current, direct current input terminals on said amplifier units, means for separating the direct current from the speech signal current received from said transmission line on said line connecting terminals, means for applying the separated direct current to said direct current input terminals of the amplifier units, a voltage stabilizing device connected across said direct current input terminals, and current storage means connected in parallel with said voltage stabilizing device.

2. Telephone apparatus as claimed in claim 1, in which said voltage stabilizing comprises a non-linear resistor of the type having a low resistance as long as the voltage across the resistor exceeds a predetermined value.

3. Telephone apparatus as claimed in claim 1, in which said current storage means is a capacitor having a high capacity of the order of 500 microfarads or more.

4. Telephone apparatus comprising an amplifier unit for outgoing speech signals, an amplifier unit for incoming speech signals, terminals for connecting the apparatus to a telephone line for transmission of speech signals and direct current, direct current input terminals on said amplifier units, means for separating the direct current from speech signal current received from said transmission line on said line connecting terminals, a rectifier bridge having input and output terminals, circuit means extending from said apparatus terminals for applying the separated direct current to the input terminals of the rectifier bridge, means connecting the output terminals of the rectifier bridge with said direct current input terminals of the amplifier units, a voltage stabilizing device connected across said direct current input terminals, and current storage means connected in parallel with said voltage stabilizing device.

5. Telephone apparatus comprising a first amplifier unit for outgoing speech signals, a second amplifier unit for incoming speech signals, said amplifier units having signal input and output terminals and direct current input terminals for applying direct current energy for the operation of the amplifier units, line connecting terminals for connecting the apparatus to a telephone line for the transmission or speech signals and direct current, a transformer having a primary winding connected with said line connecting terminals and a secondary winding connected with the signal input terminals of said second amplifier unit, capacitor means in series with said primary winding, a direct current circuit connected in parallel with said capacitor means and including said direct current input terminals of the amplifier units, voltage stabilizing means connected in parallel with said direct current input terminals of the amplifiers, and current storage means connected in parallel with said voltage stabilizing means.

6. Telephone apparatus comprising an amplifier unit for outgoing speech signals; an amplifier unit for incoming speech signals; line connecting terminals for connecting the apparatus to a telephone line for transmission of speech signals and direct current; direct current input terminals for said amplifier units; means for separating the direct current from the speech signal current; means for applying the separating direct current to the direct current input terminals of the amplifier units; voltage stabilizing means connected across said direct current input terminals; and a storage battery and a capacitor connected in parallel with the voltage stabilizing means.

7. Telephone apparatus as claimed in claim 6, comprising switching means for disconnecting said storage battery from the direct current input terminals of the amplifier unit.

8. Telephone apparatus as claimed in claim 6, comprising at least one resistor and switching means for connecting said resistor in series between said line connecting terminals on said apparatus and said storage battery.

9. Telephone apparatus as claimed in claim 6, comprising at least one resistor and switching means for connecting said resistor in series between said line connecting terminals on said apparatus and said storage battery when said telephone apparatus is not in use and for by-passing said resistor when said telephone apparatus is in use; and a further variable resistor in series between said switching means and said storage battery.

References Cited in the file of this patent

UNITED STATES PATENTS

| | | |
|---|---|---|
| 2,785,231 | Chase | Mar. 12, 1957 |
| 2,801,288 | Meacham | July 30, 1957 |